Dec. 6, 1927.
W. H. WARMAN
MECHANICAL PIPE CLEANER
Filed Aug. 21, 1926
1,651,651
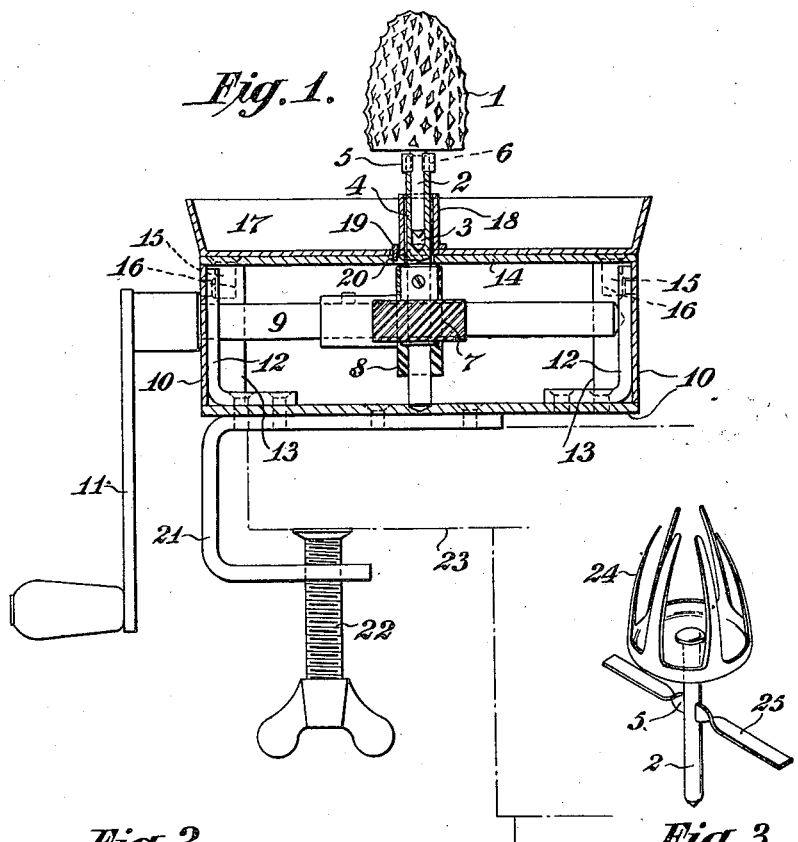
Fig.1.
Fig.2.
Fig.3.
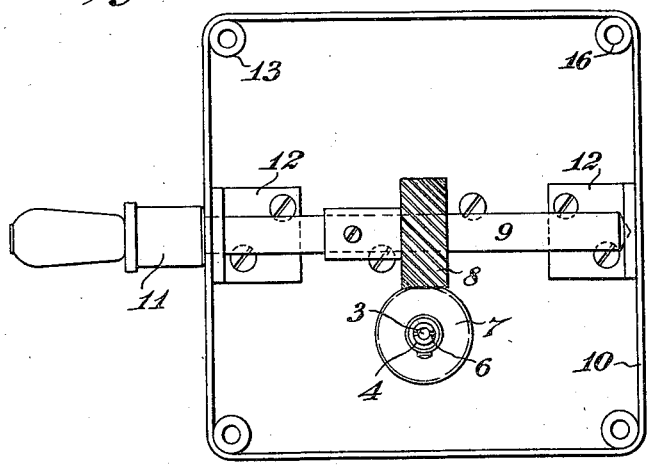
Inventor
Wm H. Warman Patented Dec. 6, 1927.

1,651,651

UNITED STATES PATENT OFFICE.

WILLIAM HOWARD WARMAN, OF PINNER, ENGLAND.

MECHANICAL PIPE CLEANER.

Application filed August 21, 1926, Serial No. 130,719, and in Great Britain August 31, 1925.

This invention which relates to a new or improved mechanical pipe scraper has in view the provision of a mechanically operated device for cleaning and cutting out a fouled pipe.

Broadly, the invention consists of a suitable mechanical gearing with means to operate same by hand or by power, the gearing being adapted to drive a reamer or other cutting or scouring tool, over which latter the bowl of the pipe is held.

In a preferred form of construction, a box-like structure or casing is clamped by suitable means to a fixture, such as the edge of a table, and houses a pair of shafts or spindles carrying inter-acting gear wheels, so that rotation of one shaft causes the other to revolve at a suitable cutting speed. The operated spindle may be driven by hand or machine power. The two spindles above referred to are preferably but not essentially at right angles to each other, the driving spindle being arranged horizontally and the driven spindle, carrying the cutting tool, vertical. The reamer or other tool, may be detachable and other interchangeable tools provided.

In order that the invention may be more readily understood reference is directed to the accompanying sheet of drawings wherein:—

Figure 1 is a vertical sectional elevation of a mechanically operated pipe cleaner in accordance with my invention.

Figure 2 is a plan view of the device with the tool, refuse tray and cover plate removed.

Figure 3 is a pictorial view of a detachable finishing tool wherein are incorporated means to facilitate removal thereof.

Referring to the drawing, a detachable tool 1 has a downwardly depending centrally disposed pin 2 adapted to be received by a socket 3 in the end of a vertical spindle 4. The pin 2 rotates with the vertical spindle 4, being held in position by a flat cross member 5 or the equivalent which passes through the pin 2 and engages with diametrically opposite slots 6 in the end of the spindle 4. A helical gear wheel 7 affixed to the vertical spindle 4 meshes with a corresponding helical gear wheel 8 affixed to a horizontal spindle 9, the end of which latter passes through the side of the casing 10 and carries a suitable handle 11 on its exterior end. Bearing brackets 12 are provided. Positioned at each interior corner of the casing 10 is a cylindrical pillar 13, to which pillars the sides of the casing 10 are soldered or otherwise secured. A cover plate 14 is provided, and is secured in position by screws 15 which engage with screwed holes 16 in the corner pillars 13. A tray 17 to collect the refuse which falls from the pipe being cleaned and to hold other cutters pending use rests upon the cover plate. The refuse tray 17 has a vertically disposed sleeve 18 which serves as a guide for the vertical spindle 4. To prevent the refuse tray from swinging about this sleeve 18 as a pivot, a small downwardly extending projection or snug 19, passes through a hole in the floor of the refuse tray and engages within a recess or "blind" hole 20 in the upper surface of the cover plate 14. A substantially U-shaped member 21, screwed, riveted or otherwise secured to the floor of the casing 10, carries a thumb-screw 22 or the equivalent device, by means of which the casing 10 is clamped to any suitable fixture 23, such as a table, mantelpiece or counter.

Figure 3 illustrates a finishing tool comprising a plurality of more or less resilient blades 24, the outer edges of which are sharpened, so that without unduly cutting the bowl of the pipe, the blades 24, by reason of their resilient nature, thoroughly scrape the interior thereof. In the tool shown, the flat cross member 5 is elongated to form finger bars 25 by means of which the tool may be readily removed without soiling the fingers. The finger bars 25 may be conveniently and are preferably employed with all kinds of tools, such as the cutter 1, Figure 1.

The device may be plated or otherwise finished and provided with ball bearings, if desired. The shape of the casing and refuse tray may be round, elliptical or any other suitable shape and in lieu of the clamping bracket described, may have aperture lugs by means of which it may be permanently attached to a fixture.

I claim:—

1. A device of the character described comprising a main housing, a driven spindle mounted therein, high speed gearing connected with said spindle, a tool socket formed in the end of said spindle, a tool detachably positioned in said socket, a refuse tray removably positioned on the main housing and centered about said driven spindle, and means on the bottom of said main housing for attaching the same to a support.

2. A device of the character described comprising a main housing, a driven spindle mounted therein, high speed gearing connected with said spindle, a tool socket formed in the end of said spindle, a tool detachably positioned in said socket, laterally extending tool positioning means on the tool shank, a refuse tray removably positioned on the main housing and centered about said driven spindle, and means on the bottom of said main housing for attaching the same to a support.

In testimony whereof I have affixed my signature hereto this 30th day of July 1926.

WILLIAM HOWARD WARMAN.